Sept. 16, 1958  H. HETTINGER  2,851,993
CATTLE CHUTE

Filed Sept. 7, 1956  4 Sheets-Sheet 1

Henry Hettinger INVENTOR.

BY *[signatures]*
Attorneys

Sept. 16, 1958 H. HETTINGER 2,851,993
CATTLE CHUTE
Filed Sept. 7, 1956 4 Sheets-Sheet 2
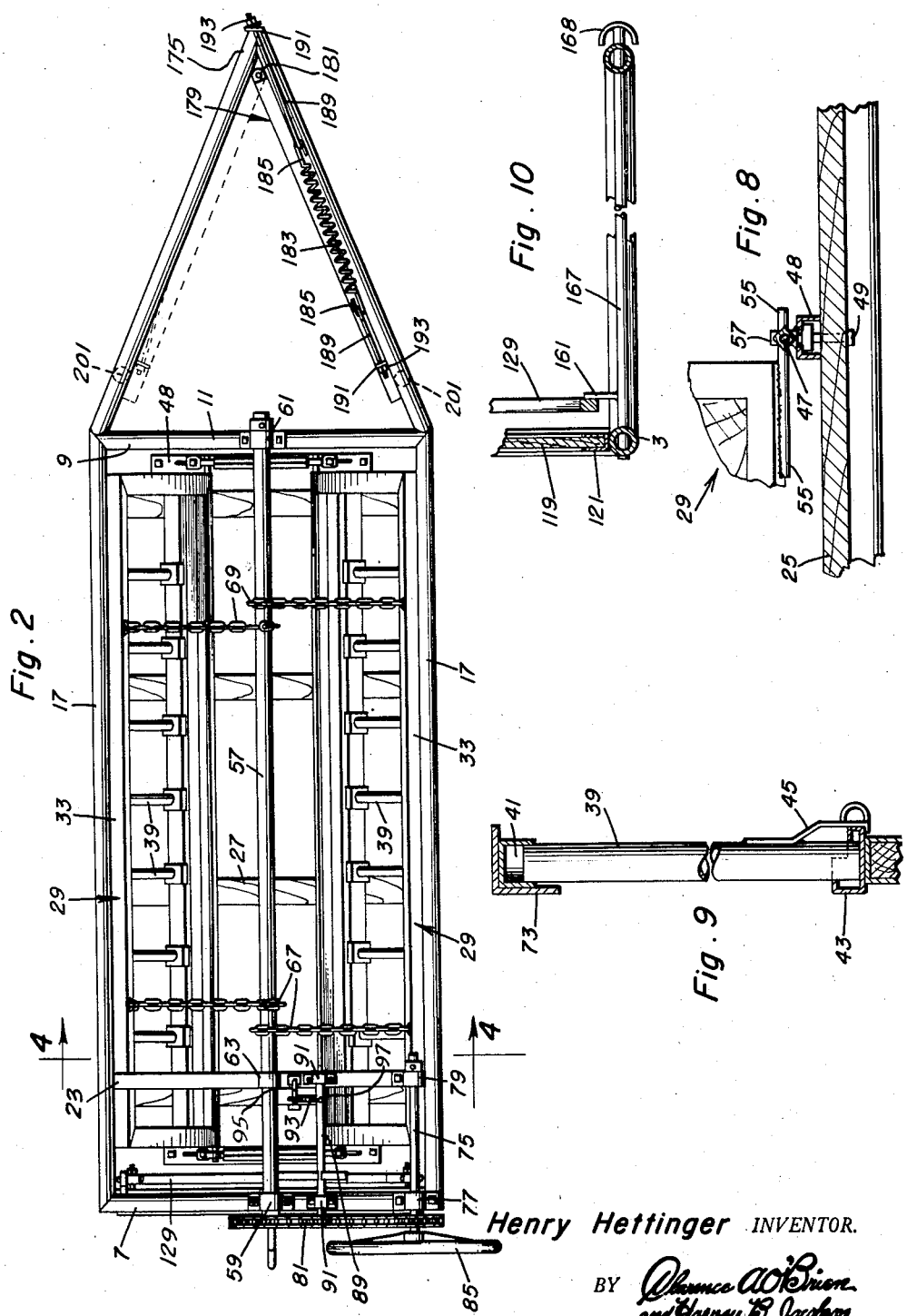
Henry Hettinger INVENTOR.

Sept. 16, 1958 H. HETTINGER 2,851,993
CATTLE CHUTE
Filed Sept. 7, 1956 4 Sheets-Sheet 3

Henry Hettinger INVENTOR.

BY
Attorneys

Sept. 16, 1958 H. HETTINGER 2,851,993
CATTLE CHUTE
Filed Sept. 7, 1956 4 Sheets-Sheet 4
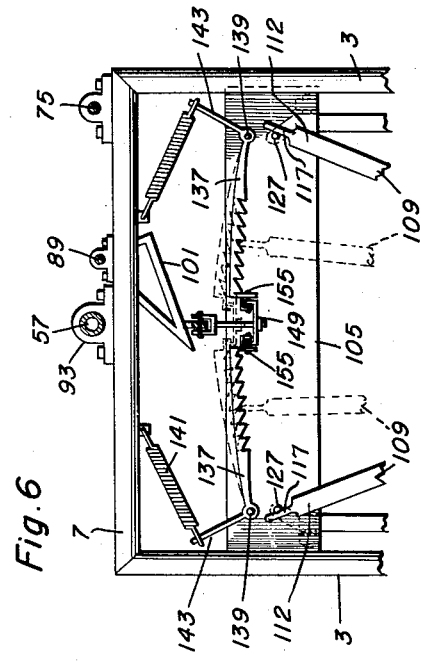
Fig. 6
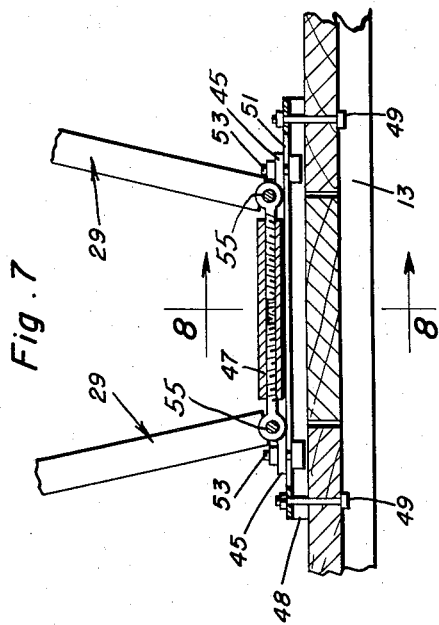
Fig. 7
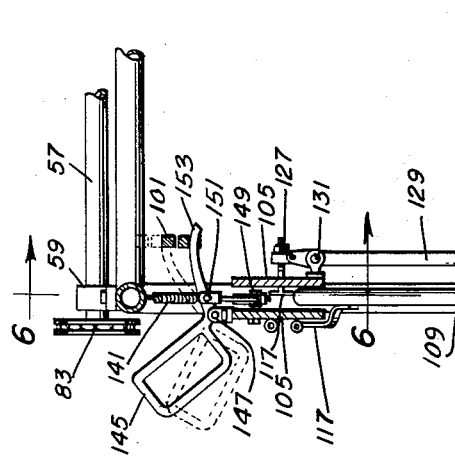
Fig. 5
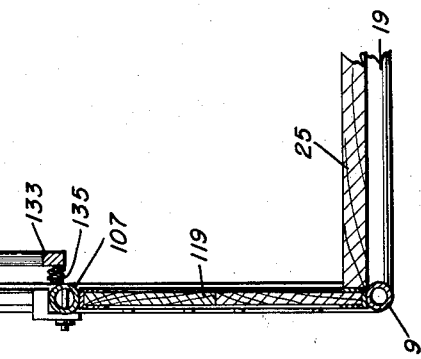
Henry Hettinger INVENTOR.
BY
Attorneys

United States Patent Office 2,851,993
Patented Sept. 16, 1958

2,851,993

CATTLE CHUTE

Henry Hettinger, Mitchell, Nebr.

Application September 7, 1956, Serial No. 608,522

6 Claims. (Cl. 119—99)

My invention relates to improvements in cattle chutes of the side squeeze panel, neck yoke type for holding cattle such as calves, steers, and heifers in position for branding, dehorning, or other treatment.

The primary object of my invention is to provide a cattle chute of the above type which is safe to use, easy to operate by one man, and embodies a rear end gate assembly whereby cattle may enter the chute from one lane and back out of the chute in another lane to facilitate separation of the cattle which have been treated from those to be treated and to facilitate evacuation of the chute by taking advantage of the natural instinct of cattle to back away from objects of which they are suspicious.

Another object is to provide in such a chute improved means for locking the squeeze panels in squeezing position and for locking neck yoke bars in effective position, together with means for unlocking the squeeze panels and neck yoke bars simultaneously from the front end of the chute, and means for unlocking the neck yoke bars from the rear end of the chute.

Yet another object is to provide in accordance with the foregoing a cattle chute which is strong, easy to move about and comparatively inexpensive to manufacture and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a view in plan of the same;

Figure 5 is an enlarged fragmentary view in vertical longitudinal section taken on the line 5—5 of Figure 3;

Figure 6 is a fragmentary view in vertical transverse section taken on the line 6—6 of Figure 5;

Figure 7 is an enlarged fragmentary view in vertical transverse section taken on the line 7—7 of Figure 1;

Figure 8 is a view in vertical longitudinal section taken on the line 8—8 of Figure 7;

Figure 9 is an enlarged fragmentary view in vertical transverse section taken on the line 9—9 of Figure 1; and Figure 10 is an enlarged fragmentary view in horizontal section taken on the line 10—10 of Figure 1.

Figure 1:
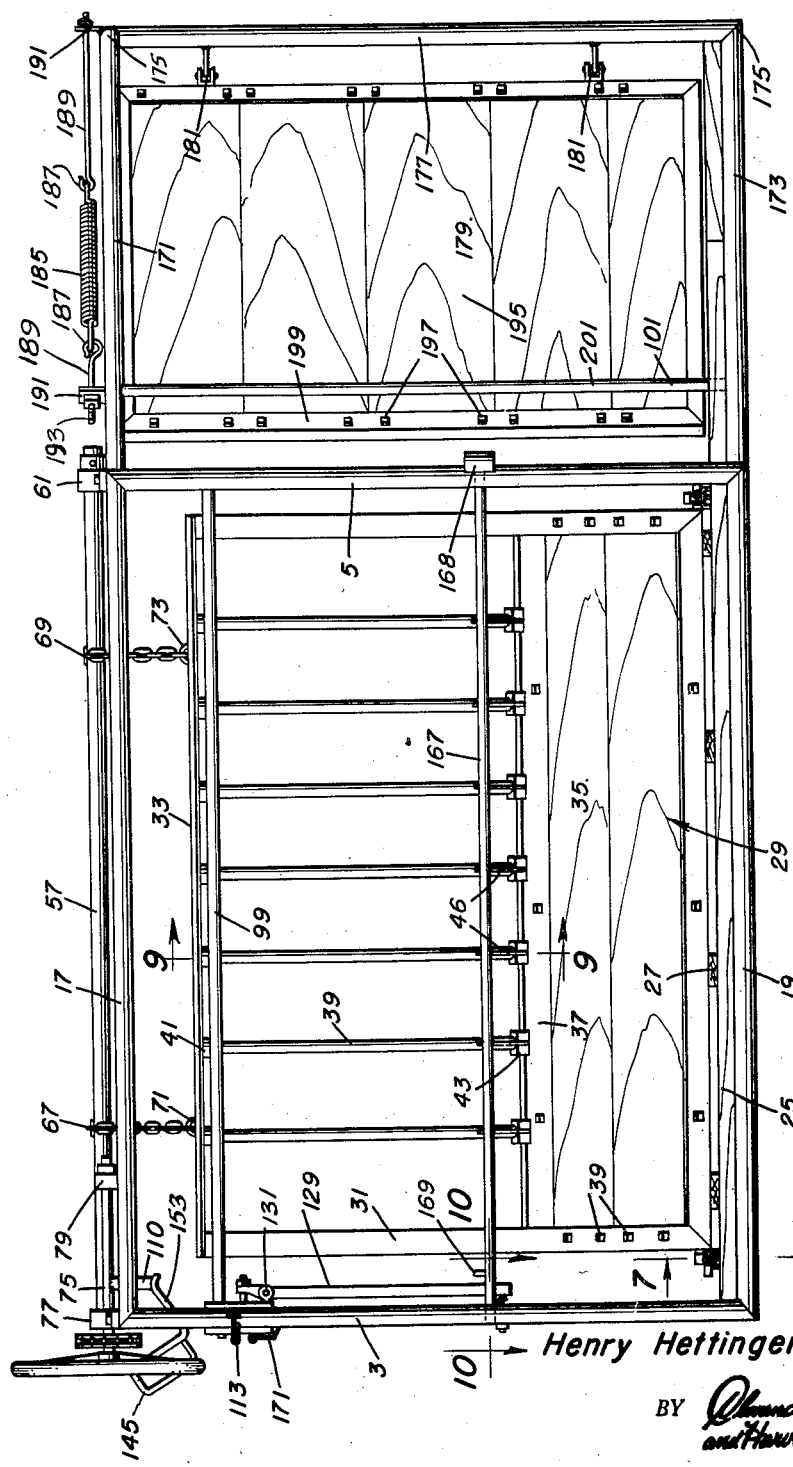
Figure 1 is a view in side elevation of my improved chute in a preferred embodiment thereof.

Referring to the drawings by numerals, the chute of my invention comprises a main rectangular frame 1 of tubing and which includes a pair of front corner uprights 3 at opposite sides of the frame, a pair of rear corner uprights 5 at opposite sides of said frame, a pair of upper and lower transverse front members 7, 9 connecting the front uprights 3, a pair of transverse upper and lower rear members 11, 13 connecting the rear end uprights 5, upper and lower longitudinal side members 17, 19 connecting the uprights 3, 5 at opposite sides of the frame, and transverse brace bar 23 connecting the upper side bars 17 adjacent the front of said frame. A plank floor 25 is supported by the lower members 9, 13 and 17 and provided with non-slip cross cleats 27 therein within said frame 1.

A pair of upright longitudinally extending, rectangular side squeeze panels 29 in the main frame 1 each comprise a U-shaped marginal channel bar 31, a top longitudinal angle bar 33, a lower side wall 35 of planks capped by a longitudinal channel bar 37 and bolted, as at 39, to said bars 31, 37 and laterally spaced upright rods 39 interposed between the bars 33, 37. The rods 39 are removable for access to an animal positioned between the squeeze panels 29 and for that purpose are fitted in upper and lower pairs of sockets 41, 43 on the bars 33, 37, respectively, the lower sockets 43 being open at one side as best shown in Figure 9 and having rod retaining spring latches 46 thereon.

The squeeze panels 29 are hinged at lower corners thereof for swinging toward and from each other into closed and opened positions to engage and disengage the sides of an animal therebetween by means of pairs of opposite suitable hinges 45 suitably fastened to said squeeze panels 29, the hinges 45 of the pairs being connected by a turnbuckle 47 and mounted for adjustment thereby to laterally adjust the squeeze panels 29 according to operating requirements.

Each pair of hinges 45 is slidably adjustably imposed on a transverse inverted channel bar 48 bolted at its ends as at 49, to the floor 25 and having a longitudinal slot 51 therein through which bolts 53 in the hinges 45 slidably extend. The hinges 45 may comprise pintle rods 55 on squeeze panels 29.

For swinging the squeeze panels 29 closed a longitudinal shaft 57 on top of and in the longitudinal center of the main frame 1 is journaled in bearings 59, 61 on the upper front and rear members 7, 11 and in a bearing 63 on the transverse brace bar 23 connecting the upper side members 17.

Front and rear pairs of chains 67, 69 are terminally connected as at 71, 73, to the top bars 33 of the squeeze frames 29 and are oppositely wound in each pair and suitably connected terminally to the shaft 57 for winding up to swing the squeeze panels 29 toward each other upon rotation of said shaft 57 in one direction. Means for rotating the shaft 57 to wind up the chains 67, 69 is provided comprising a longitudinal shaft 75 on top and at one side of the main frame 1 journaled in bearings 77, 79 on the front upper top member 7 and the bar 23 and which is operatively connected to said shaft 57 in front of said frame 1 by a sprocket and chain drive 51 and which includes a sprocket wheel 83 on the shaft 57. The shaft has fixed thereto in front of said frame 1 an operating hand wheel 85.

Figure 4:
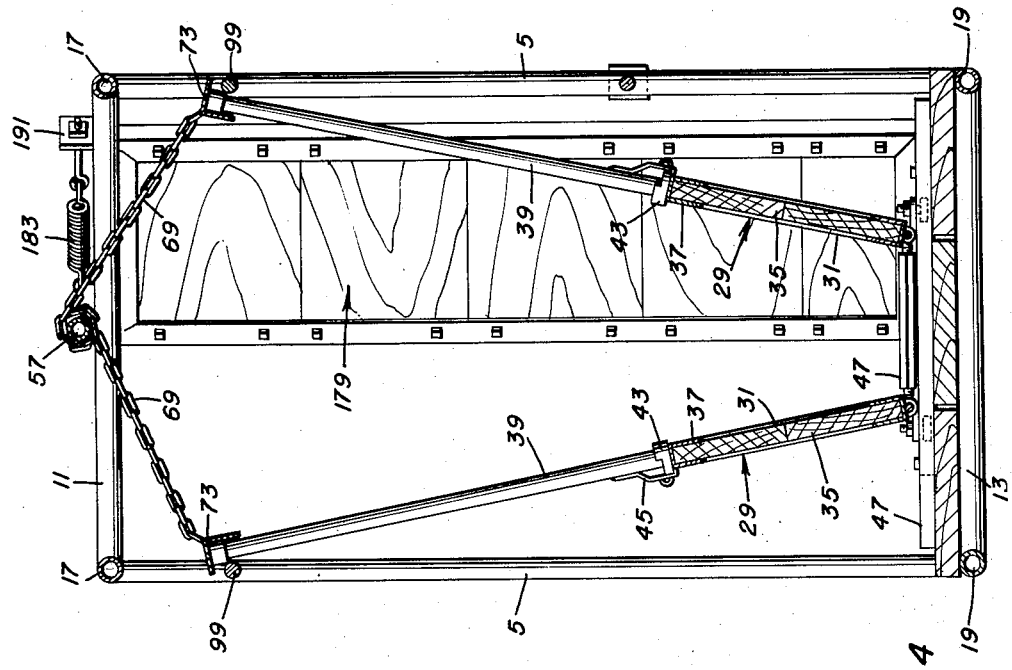
Figure 4 is an enlarged view in vertical transverse section taken on the line 4—4 of Figure 2.

The shaft 57 is releasably locked when the squeeze frames 29 are in closed or squeezing position by means of a releasable locking dog 87 for the sprocket wheel 83 fixed on a longitudinal rock shaft 89 journaled in bearings 91 on the upper front member 7 and the bar 23 between shafts 57, 75. A tension spring 93 terminally connected to studs 95, 97 on the bar 23 and said rock shaft 89 rocks the latter in one direction to engage the dog 87 with the sprocket wheel 83. As will be seen, rocking of the rock shaft 89 in the opposite direction will disengage said dog 87 to unlock the squeeze panels 29 whereupon the squeeze panels 29 may be manually swung into open disengaging position while the dog 87 ratchets over said wheel 83 and the chains 67, 69 unwind with the shaft 57 rotating idly together with the shaft 75. Upper longitudinal side rods 99 fixed in the main frame 1 limit swinging of the squeeze panels 29 away from each other into open position, as best shown in Figure 4. A triangular lever 101 depends from the rock shaft 89 for movement upwardly to rotate said shaft 89 in the opposite direction to unlock the squeeze panels 29.

The neck yoke 103 comprises a pair of laterally spaced apart, opposite panels 105 extending transversely between the front uprights 3 beneath the upper front member 7, and forming the top of the yoke, a transverse tubular member 107 between said panels 105 and the front end lower member 9 forming the bottom of said yoke, and a pair of upright side yoke bars 109 pivoted at 111 at their lower ends to the member 107 for lateral swinging toward and from each other into and from yoking and releasing position relative to an animal's neck inserted between the side yoke bars.

A pair of horizontal oppositely arranged tension springs 113 are terminally connected to the front uprights 3 as at 115, and to upright fingers 117 on the upper ends 112 of the side yoke bars 109 and urge the latter toward each other into yoking position. A front plank wall 119 bolted in a marginal channel frame 121, as at 123, closes the space between the members 107, and 9. Triangular front wall planks 125 suitably secured to the uprights 3 extend from the panels 105 to the member 107 and close the space between said uprights 3 and said side yoke bars 109.

Figure 3:
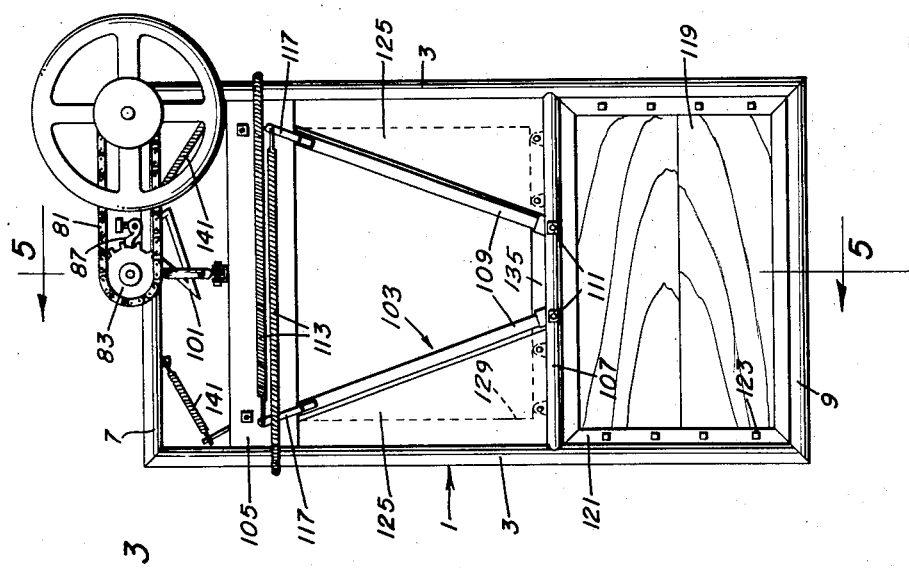
Figure 3 is a view in front end elevation.

The upper ends 112 of said side yoke bars 109 and the fingers 117 play between the panels 105 as the said side yoke bars 109 are swung by the springs 113 toward each other from releasing upwardly diverging position as shown in Figure 3 in full lines into substantially parallel yoking position as shown in Figure 6 in dotted lines.

Horizontal locking pins 127 slidable in the panels 105 are movable into and out of engaging intercepting relation to the fingers 117 in the releasing position of the side yoke bars 109 to lock and unlock the side yoke bars 109, as best seen in full lines in Figure 6. The pins 127 are operative by a breast yoke now to be described.

A U-shaped breast yoke 129 in the rear of the side yoke bars 109 of the neck yoke 103 has the pins 127 fixed thereon at its upper ends and is pivoted adjacent its upper ends, as at 131, on the rear panel 105 for swinging clockwise, as viewed in Figures 1 and 5, from intercepting engagement with the fingers 117 to withdraw said pins 127 and unlock the side yoke bars 109 for swinging into yoking position. The breast yoke 129 has a lower bight portion 133 engageable by the breast of an animal inserting its neck in the neck yoke 103 and the breast yoke 129 for swinging said breast yoke 129 clockwise. Coil springs 133 between said bight portion 135 and the member 107 tension the breast yoke 129 against said swinging. The fingers 117 of the side yoke bars 109 wipe past said pins 127 when said breast yoke 129 is swung either manually or by an animal into releasing position.

Means for locking the side yoke bars 109 in yoking position comprises a pair of arcuate inverted ratchet toothed bars 137 between the panels 105 spaced apart end to end and pivoted at outer ends thereof, as at 139, for vertical swinging and extending transversely of said yoke bars 109. The fingers 17 on the upper ends 112 of the side yoke bars 109 engage and ratchet along and under said bars 137 when said side yoke bars 109 are swung toward yoking position by the springs 113 and are locked by the teeth of said bars 137 in different yoking positions by the fingers 117 and said bars 137.

The locking bars 137 are swingable upwardly into unlocking position in opposition to tension springs 141 terminally attached to the upper front member 7 and to crank arms 143 on said bars 137. A front hand lever 145 is pivoted, as at 147, on the front panel 105 for vertical rocking from a normal position shown in full lines in Figure 5 into a ratchet bar unlocking position shown in dotted lines in Figure 5 and is operatively connected to confronting inner ends of said bars 137 to swing the latter upwardly, as shown in dotted lines in Figure 6, into unlocking position in which said bars 137 disengage the fingers 117. The operating connection comprises a depending inverted T-shaped coupling 149 pivoted, as at 151, on a tail end 153 of said lever 145 and which depends between said panels 105 and underlies said inner ends of said ratchet bars 137 and is slidably pivoted, as at 155, thereto. When the hand lever 145 is rocked to unlock said ratchet bars 137 its tail end 153 raises the before-mentioned lever 101 to rock the shaft 89 in a direction to disengage the locking dog 57 to unlock the squeeze panels 29. Thus the neck side yoke bars 109 and the squeeze panels 29 are simultaneously unlocked by said hand lever 145 at the front end of the chute for release of an animal by manual swinging of the neck side yoke bars 109 apart and corresponding swinging of the side squeeze panels 29.

A horizontal push rod 167 with a handle 168 is slidably mounted in the uprights 3, 5 on one side of the main frame 1 for manual pushing forwardly from the rear end of said frame to unlock the neck yoke side bars 129 for swinging into yoking position. For this purpose, said rod 167 is provided with a lateral finger 169 engageable with the breast yoke 129 for pushing and swinging the same clockwise.

The rear end gate assembly comprises a pair of horizontal upper and lower, tubular extension frames 171, 173 on the rear end of the main frame 1 of V-shape tapering rearwardly to apex portions 175 connected by a tubular upright 177 in the longitudinal center of said frame 1. The floor 25 overlies the lower extension 173.

A vertical gate 179 is hinged, as at 181, to the upright 175 and extends forwardly therefrom for swinging in the frames 171, 173 into opposite limits of closing movement against opposite sides of said frames 171, 173, as shown in full and dotted lines in Figure 1, to close the chute at opposite sides thereof.

A gate restraining tension spring 183 at the top of said gate has its opposite ends 185 hooked to eye ends 187 on rods 189 pivoted in lugs 191 on the upright 175 and the gate 179 and provided with terminal adjusting nuts 193 for varying the tension of the spring 183. The spring 183 swings the gate 179 into past dead center closing positions to yieldingly hold said gate closed.

The gate 179 preferably comprises planks 195 bolted, as at 197, in a channel bar 199. Vertical rods extending between the frames 171, 173 at opposite sides thereof remote from upright 175 brace said frames 171, 173.

In operating the described chute, the gate 179 is swung into position to close the chute at its rear end at one side of the chute, as shown in full lines in Figure 2, and an animal driven into the chute from the other side with the squeeze panels 29 open and the side yoke bars 109 manually swung into releasing position. As the animal is driven forward its head extends between said side yoke bars 109 and its breast engages the bight portion 133 of the breast yoke 129 and swings said yoke 129 clockwise in opposition to the springs 135 thereby retracting the locking pins 127 and releasing said bars 109 for swinging into yoking position by the springs 113 in which position said bars 109 are locked in the manner already described by the ratchet toothed locking bars 137.

The hand wheel 85 is then operated to operate the shaft 57 for swinging of the squeeze panels 29 into squeezing position against the sides of the animal. After the animal has been given the desired treatment the handle 145 is operated to simultaneously unlock the side yoke bars 109 and the squeeze panels 29 in the manner previously described for manual swinging of said yoke bars 109 apart and like operation of the squeeze panels 29 for release of the animal thereby which may then back toward the rear end of the chute. At any time before or during treatment of the animal, the gate 179 may be swung into open the rear end of the chute at the previously closed side and close the other side so that the treated animal may back out of the chute at the rear end and opposite side from which it entered. Thus, animals may be driven into the chute from a lane at one side thereof and discharged into a lane at the other side of the chute and by separating the lanes by a fence extending to the upright 191 the untreated and treated animals may be separated the advantage of which will be manifest.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a cattle chute, a rectangular frame having front and rear ends and sides, a pair of side squeeze panels hinged on said frame for swinging toward and from each other into and from squeezing position, a pair of upright side yoke bars pivoted at lower ends thereof in the front end of said frame for swinging toward and from each other into and from yoking position, means on said frame for swinging said side panels toward each other including a rotary shaft, releasable locking means on said frame for said shaft operatively connected to said shaft, coacting releasable locking means in said frame and on said side yoke bars for locking said side yoke bars in yoking position, manual means in said frame operatively connected to both said locking means for simultaneously releasing both said locking means from the front end of the chute, a gate at the rear end of the chute swingable into oppositely inclined positions to admit an animal into the chute from one side thereof and permit the animal to back out of the chute at the opposite side thereof, releasable locking means mounted in said front end for locking said side yoke bars against swinging into yoking posision normally engaging and locking said side yoke bars and slidable into disengaging yoke bar releasing position, and means mounted on said front end operative by pushing of an animal thereagainst and operatively connected to said last named locking means to slide the same into releasing position.

2. In a cattle chute, a rectangular frame having front and rear ends, a pair of side squeeze panels hinged in said frame for swinging toward and from each other into and from squeezing position, a pair of upright side yoke bars pivoted at the lower ends thereof in the front end of said frame for swinging toward and from each other into and from yoking position, means on said frame for swinging said side panels toward each other including a rotary shaft, releasable locking means on said frame for locking said shaft operatively connected to said shaft, coacting releasable locking means in said frame and on said side yoke bars for slidably engaging and locking said side yoke bars in yoking position and disengageable from said side bars to release the same and manual means on the front end of the frame operatively connected to both said locking means for releasing both said locking means simultaneously from the front end of the chute.

3. The combination of claim 2, said second named releasable locking means comprising a pair of ratchet bars having spaced apart confronting ends and remote ends pivoted on said frame, said side yoke bars having upper ends ratcheting along said teeth and locked thereby against swinging from yoking position, said ratchet bars being swingable upwardly to release said upper ends, said manual means being operatively connected to the confronting ends of said ratchet bars to swing said ratchet bars upwardly.

4. The combination of claim 3, said manual means comprising a handle pivoted on said frame and operatively connected to the confronting ends of the ratchet bars and to said locking means for said shaft.

5. In a cattle chute, a rectangular frame having front and rear ends, a pair of side yoke bars pivoted at lower ends thereof to said front end for vertical swinging into and from yoking position, locking pins in said front end slidable into and from intercepting engaging relation to to said side yoke bars to lock the same against swinging into yoking position and to release said side bars, a spring tensioned breast yoke pivoted to the front end of the frame for swinging by engagement of the breast of an animal against the same and in opposition to the tension exerted thereagainst, said pins being mounted on said breast yoke for sliding thereby.

6. The combination of claim 5, and a push rod slidably mounted on said frame and operative from the rear end of the frame to swing said breast yoke.

References Cited in the file of this patent

UNITED STATES PATENTS

| 182,688 | Minor | Sept. 26, 1876 |
| 2,268,707 | Huckelbridge | Jan. 6, 1942 |
| 2,504,214 | Miller et al. | Apr. 18, 1950 |
| 2,510,703 | Linton | June 6, 1950 |
| 2,587,160 | Howe | Feb. 26, 1952 |
| 2,674,980 | Bentley | Apr. 13, 1954 |
| 2,703,554 | Haggard et al. | Mar. 8, 1955 |